Aug. 12, 1941.  O. J. RAINVILLE  2,251,957
NEEDLE WELDING MACHINE
Filed June 17, 1940   5 Sheets-Sheet 1

Inventor
Omer J. Rainville

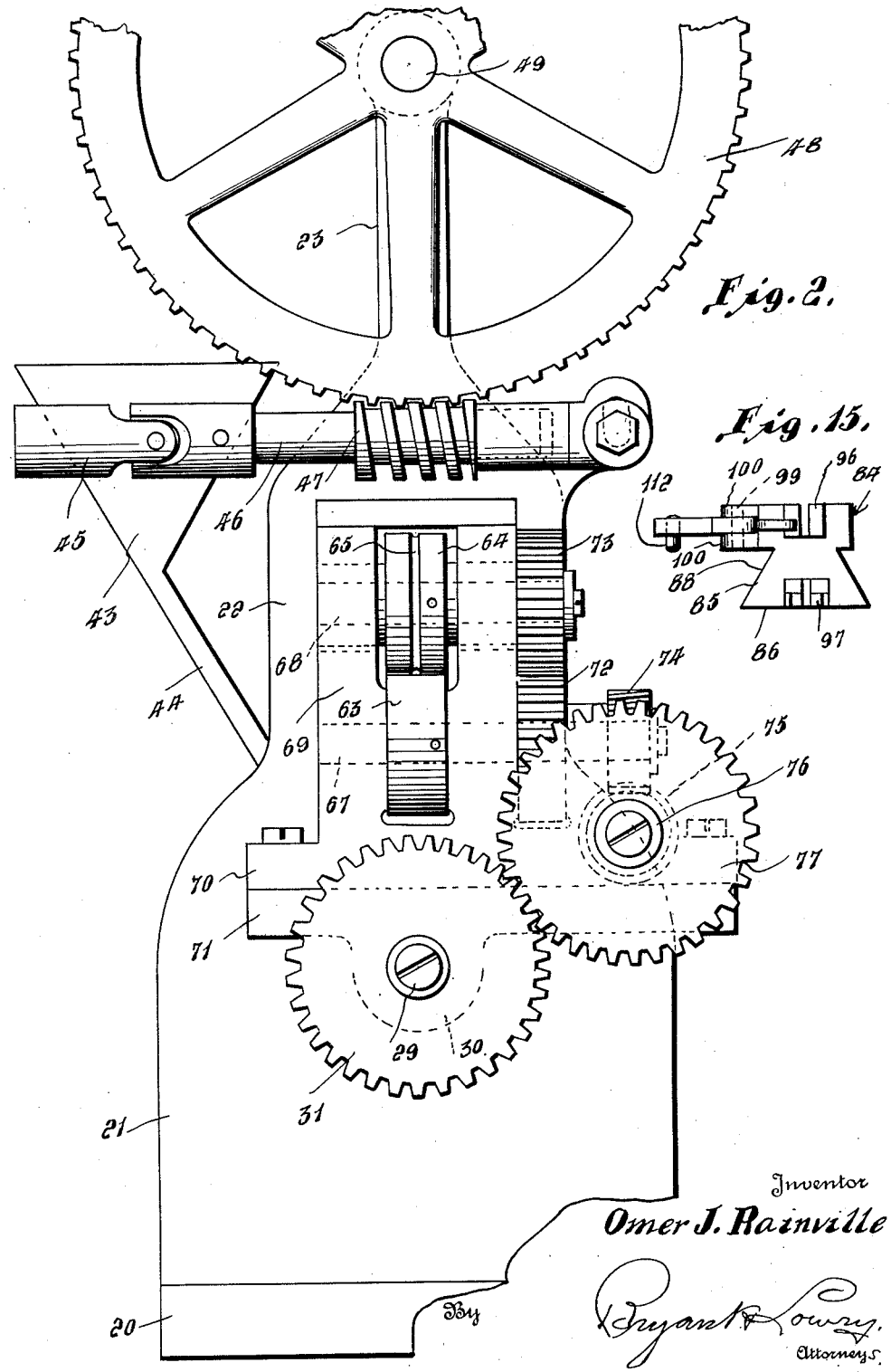

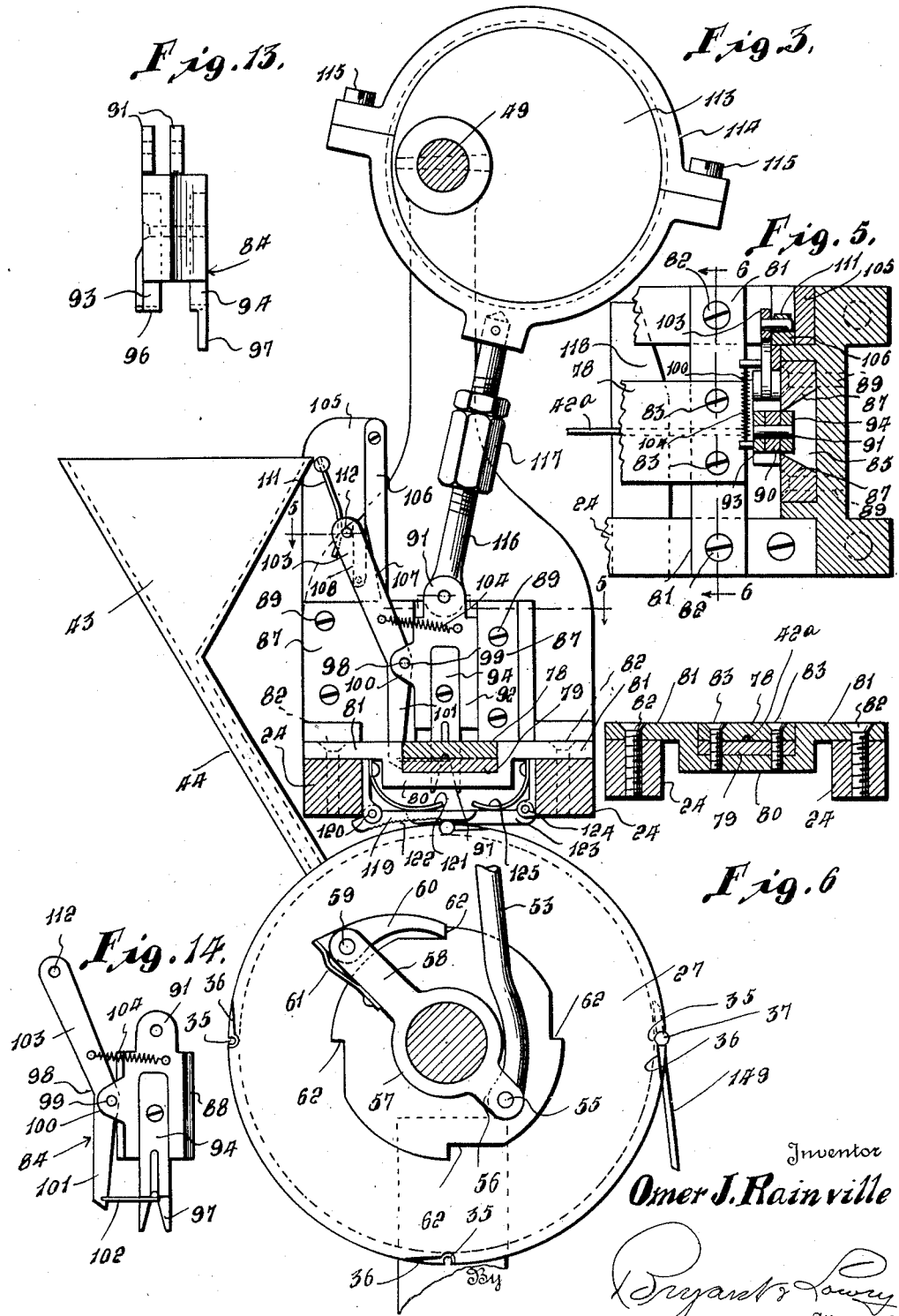

Aug. 12, 1941.  O. J. RAINVILLE  2,251,957
NEEDLE WELDING MACHINE
Filed June 17, 1940  5 Sheets-Sheet 4

Inventor
Omer J. Rainville
By Bryant & Lowry
Attorneys

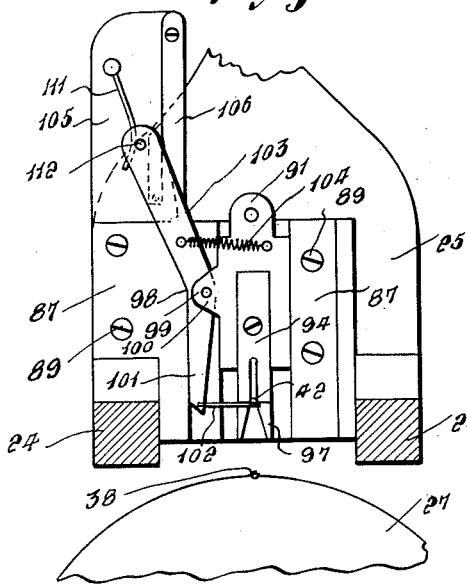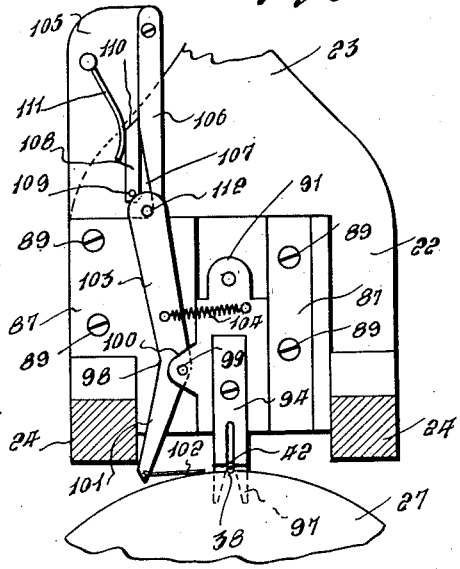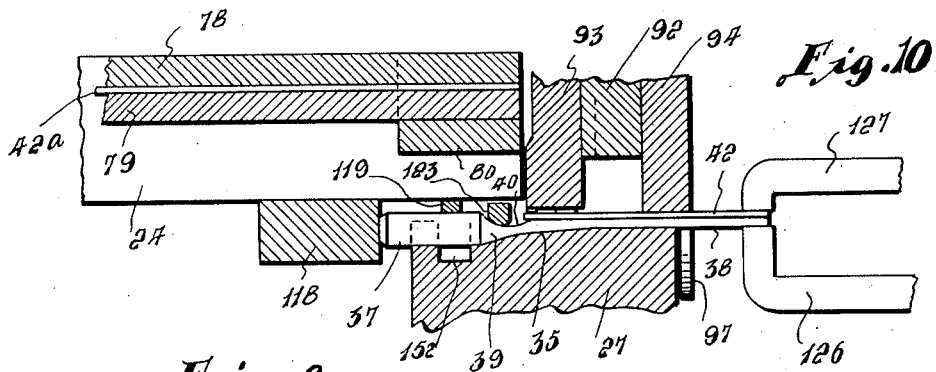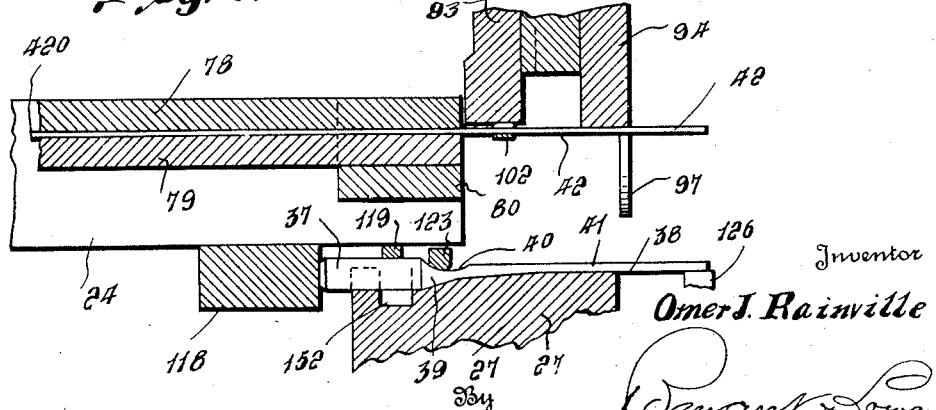

Patented Aug. 12, 1941

2,251,957

UNITED STATES PATENT OFFICE 2,251,957

NEEDLE WELDING MACHINE

Omer J. Rainville, South Attleboro, Mass., assignor to E. Z. I. Needle Company, Incorporated, Providence, R. I.

Application June 17, 1940, Serial No. 341,051

20 Claims. (Cl. 219—4)

This invention relates to certain new and useful improvements in needle welding machines.

The primary object of the invention is to provide a needle welding machine especially designed for the welding of a resilient thread guide arm to the shank of a needle, particularly a sewing machine needle of the type disclosed in application for patent filed by Omer J. Rainville for Sewing machine needle on April 30, 1940, Serial No. 332,552.

A further object of the invention is to provide a needle welding machine wherein needle blanks are delivered to a rotatable drum with devices for positioning and holding a needle blank for placement and contact therewith of a resilient thread guide arm combined with welding devices for attaching the resilient thread guide arm to the shank of the needle blank in proximity of the eye end thereof.

A further object of the invention is to provide a needle welding machine wherein preformed needle welding blanks with flattened sides having a longitudinally extending center rib at the flattened side defining lateral thread guide grooves is adapted to have a resilient thread guide arm welded to the flattened side in proximity of the eye end of the needle blank, the resilient thread guide arm being delivered to the machine in continuous strip form from a reel with cutting and shaping dies for cutting the strip into thread guide arm length and moving the same into engagement with needle blank.

A further object of the invention is to provide a needle welding machine of the foregoing character wherein the needle blanks have flattened sides to which a resilient thread guide arm is attached by a welding operation, the needle blank comprising a mounting hub and shank connected by a conical neck having an arcuate flattened depression with positioning fingers cooperating with the supporting hub and arcuate flattened face in the conical neck of the needle blank for locating the flattened side of the needle blank in position for contact and placement therewith of the resilient thread guide arm.

With the above and other objects in view that will become apparent as the nature of the invention is better understood, the same consists in general of certain novel details of construction and combination of parts hereinafter more fully described, illustrated in the accompanying drawings and claimed.

Figure 1:
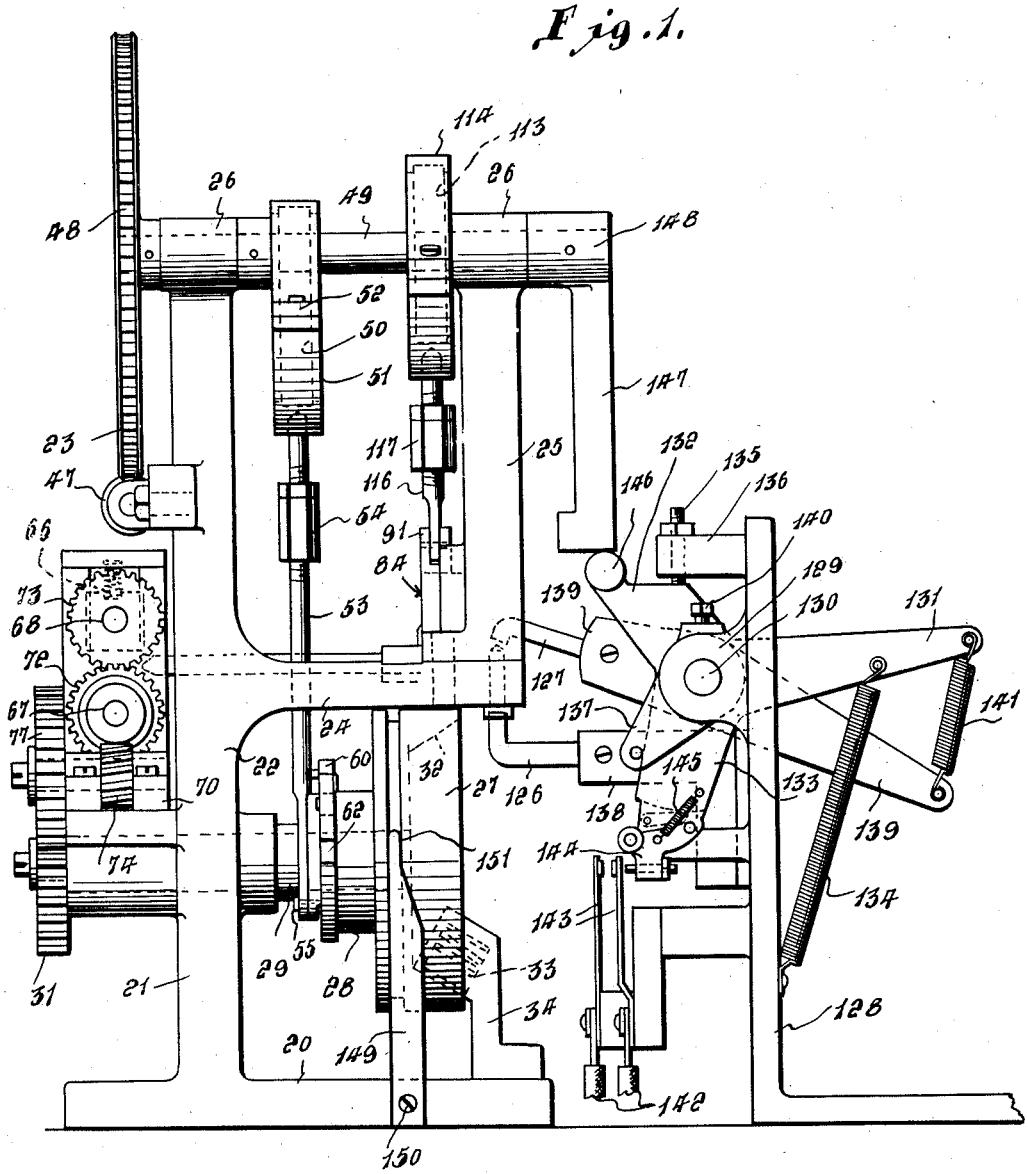

In the accompanying drawings:

Figure 1 is a front elevational view of a needle welding machine constructed in accordance with the present invention, showing the welding apparatus and the control means therefor for attaching a resilient thread guide arm to the shank of a needle blank.

Figure 16:
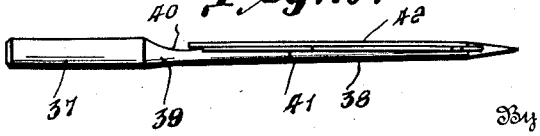
Figure 4:
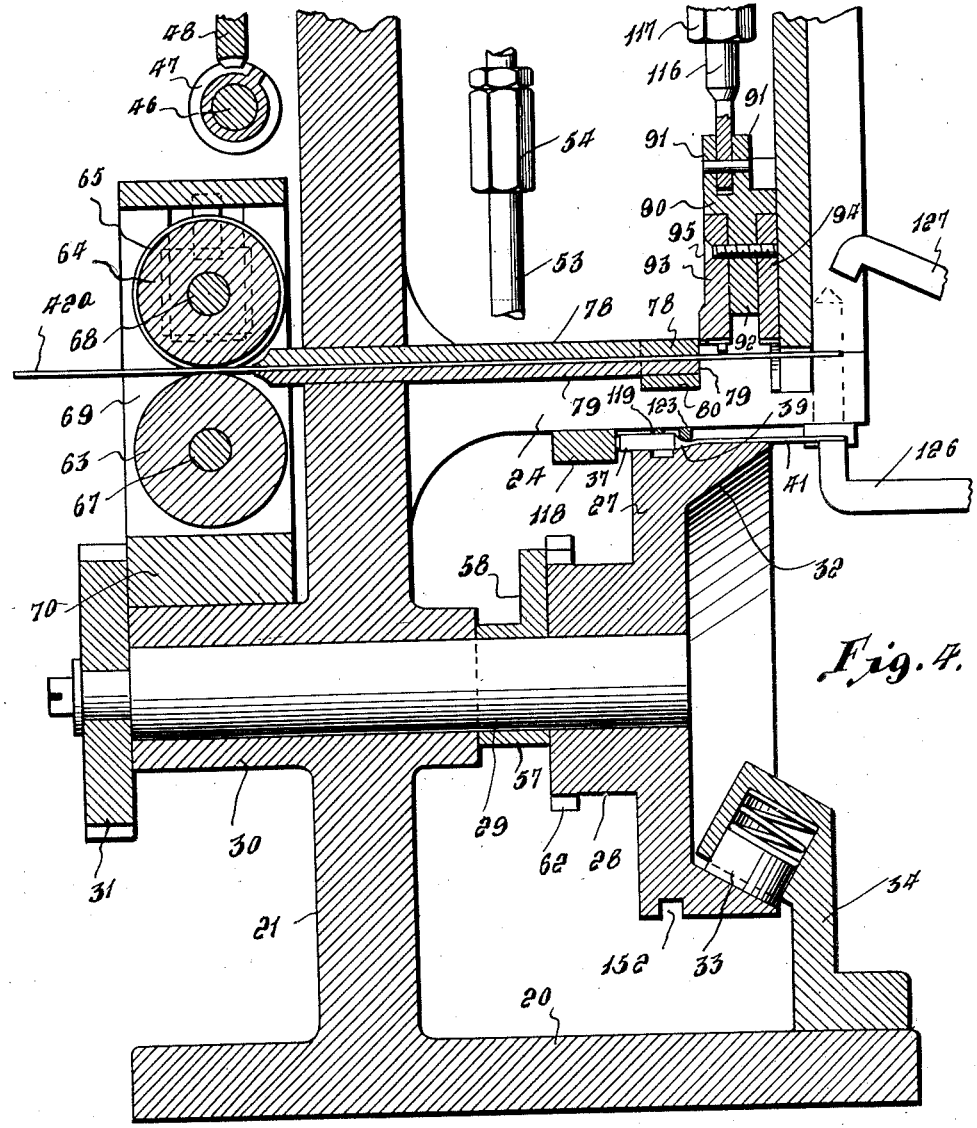
Figure 11:
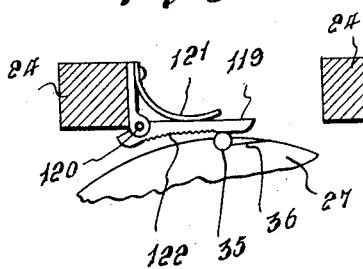
Figure 12:
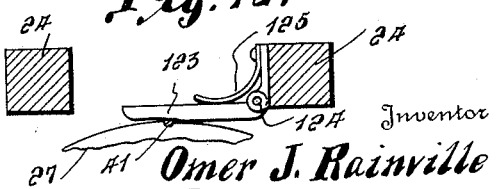

Figure 2 is a fragmentary and elevational view showing a part of the operating devices for the movable elements of the machine, Figure 3 is a vertical cross-sectional view showing the hopper for feeding needle blanks to a drum rotated in step-by-step movement, the needle blank rotating and positioning members and the carrier and operating means therefor for the resilient thread guide arm to carry the same to the needle blank on the drum, Figure 4 is a fragmentary vertical longitudinal sectional view showing the feed rollers for the strip of material from which the resilient thread guide arms are cut and formd and illustrating a needle blank supported on the rotatable drum below the carriers, Figure 5 is a horizontal sectional view taken on line 5—5 of Figure 3, Figure 6 is a vertical cross-sectional view taken on line 6—6 of Figure 5, Figure 7 is a detail sectional view showing the vertically slidable carrier for the resilient thread guide arm in its upper position and a supporting finger cooperating therewith for holding the resilient thread guide arm in position for delivery to a peripheral seat in the rotatable drum, Figure 8 is a detail view similar to Figure 7 showing the vertically slidable carrier for the resilient thread guide arm in its lowered position to place the thread guide arm upon a needle blank carried by the drum and with the finger for retaining the thread guide arm in position on the carrier shifted to its releasing position, Figure 9 is a detail sectional view showing the needle blank supported on the drum with the mounting hub and conical neck thereof engaged by the tensioned levers that respectively rotate and hold the needle blank in position with the combined vertically slidable carrier and die for cutting a resilient thread guide arm from a strip of material in its upper position and with the projecting eye end of the needle blank supported upon a lower negative electrode, Figure 10 is a detail sectional view similar to Figure 9, showing the combined carrier and die in its lowered position for holding the resilient thread guide arm on the shank of the needle blank and with the upper movable positive electrode engaged with the adjacent end of the resilient thread guide arm, Figure 11 is a detail view, partly in section, showing the tensioned lever for rotating the needle blank on the supporting drum into position to present the flat side of the shank of the needle in an upward direction, Figure 12 is a detail view, partly in section, showing the tensioned lever engaging the upper flat side of the needle blank for holding the same in position, Figure 13 is a side elevational view of the combined carrier and die for the resilient thread guide arm, Figure 14 is a front elevational view of the carrier and die, Figure 15 is a top plan view of the carrier and die or cutter, and Figure 16 is a side elevational view of the completed needle with the resilient thread guide arm welded to the shank of the needle blank.

The needle welding machine comprises a frame shown more clearly in Figures 1, 2 and 4 as having a base plate 20 from which a perpendicular wall 21 rises therefrom adjacent one end, the upper side edges of the wall 21 being arched toward each other and carrying a pair of upright side bars 22 that merge together at their upper ends and from which merged upper ends rises a vertical arm 23. A pair of horizontal bars 24 project laterally of the upper end of the perpendicular wall 21 at opposite sides thereof and overlie the base plate 20, while a perpendicular bearing plate 25 rises from the outer ends of the bars 24, the upper ends of the arm 23 and the bearing plate 25 terminating in the same horizontal plane and each being provided with a shaft bearing 26 at its upper end. The frame structure described supports a rotatably mounted wheel or drum upon the peripheral wall of which needle blanks are supported with devices for rotating the drum in a step-by-step movement to position a groove in the peripheral surface thereof for the reception of a needle blank, devices for effecting step-by-step rotation of the drum, means for feeding a strip of wire from a reel into the machine with devices for cutting off a section of the strip of wire into a length to produce a resilient thread guide arm and carrying said cut length of wire into position for placement upon the shank of a needle blank and means for electrically welding the resilient thread guide arm to the needle blank.

The needle blank supporting drum designated by the reference character 27 has a center hub or bearing 28 fixed to the shaft 29 that is horizontally journaled in the bearing 30 carried by the perpendicular wall 21, the shaft 29 extending beyond the bearing 30 and having a gear wheel 31 fixed thereto. The drum 27 is dished inwardly at its outer side to provide an inclined annular wall 32 that is engaged by a spring-pressed friction block 33 carried by a support 34 mounted on the base plate 20 for steadying rotation of the drum 27 and acting to restrain vibratory movements thereof. The peripheral surface of the drum 27 is provided with four transversely extending grooves 35 having entrance depressions 36 at one side thereof, the grooves 35 being adapted for the reception and support of a needle blank, a finished needle being shown in Figure 16 as comprising a mounting hub 37, a shank 38 and a conical neck 39 connecting the mounting hub and shank. One side of the conical neck 39 is concaved and flattened as at 40 and one side of the needle shank 38 is cut away as at 41 for the reception of a resilient thread guide arm 42.

The needle blanks without the resilient thread guide arm 42 are placed in a hopper 43 supported on the frame structure of the machine and said hopper, as shown in Figure 3, has a discharge chute 44, the lower outlet end of which extends across the peripheral surface of the drum 27 so that during rotation of the drum by means presently to be described, the needle blanks are singly fed to the needle blank supporting grooves 35 in the drum as will at once be apparent from an inspection of Figure 3.

The operating devices for effecting step-by-step rotation of the drum 27 include a power driven universal connector 45 in communication with a shaft 46 horizontally journaled on the frame structure at the upper ends of the side bars 22, the shaft 46 carrying a worm 47 that meshes with a relatively large worm wheel 48 that is fixed to one end of the shaft 49 journaled in the bearings 26 at the upper ends of the vertical arm 23 and the perpendicular bearing plate 25. As shown in Figure 1, the disk 50 has the shaft 49 extending eccentrically therethrough with the disk 50 anchored to said shafts, a two-part band strap 51 surrounding the eccentrically mounted disk 50 and having the ends thereof secured together as at 52. A pitman rod 53 having a turn-buckle adjustment 54 has one end secured to the band strap 51 and the other or lower end thereof that extends downwardly between the horizontal arms 24 pivotally connected at its lower end as at 55 to an arm 56 projecting outwardly from a bearing 57 journaled on the shaft 29 between the hub 28 of the drum 27 and bearing 30 carried by the perpendicular wall 21. The tubular bearing 57 carries at the side thereof diametrically opposite the arm 56 a longer arm 58 that has pivotally mounted at its outer end as at 59 a pawl 60 that is tensioned by the spring 61 carried by the arm 58.

As shown in Figures 1, 3 and 4 the hub 28 of the drum 27 adjacent the bearing 57 carries four peripheral ratchet teeth 62 spaced 90° apart for cooperation with the tensioned pawl 60 and said ratchets are respectively radially alined with the needle blank receiving grooves in the peripheral surface of the drum. Also, the eccentrically mounted disk 50 is of such size as to cause rotation of the drum 27 through an arc of 90° by means of the pawl and ratchet devices during a ninety-degree rotation of the eccentric disk 50 and resulting in the positioning of one of the peripheral slots in the drum 27 with the needle blank therein to have a resilient thread guide arm welded thereto. It will also be understood that during rotation of the drum 27 beneath the discharge chute 44 of the needle blank hopper 43, a needle blank will pass from the discharge chute into a groove 35 registering therewith and that the intermediate plain surfaces of the drum between the grooves provide a closure for the discharge chute.

As customary with sewing machine needles, the shank 38 of the needle is cylindrical in cross-section and the cut-away side portion 41 provides a flat side face, while the resilient thread guide arm 42 is of a cross-sectional shape providing a flat side engageable with the flat side 41 of the shank 38 and an outer rounded side that restores the shank of the needle to complete cylindrical formation. The resilient thread guide arm 42 is preformed in the shape described in cross-section and is fed from a continuous wire unwinding from a reel, the strand of wire 42$^a$ as illustrated being fed between a pair of rollers 63 and 64 superposed with respect to each other as shown in Figures 2 and 4, the upper roller 64 being annularly grooved as at 65 to take the rounded side of the wire strand 42. A resilient mounting 66 is provided for the upper feed roller 64 to provide the desired frictional engagement with the wire strand 42ª to effect feeding thereof through the machine. The bearing shafts 67 and 68 for the feed rollers 63 and 64 are journaled in a frame plate 69 carried by a base member 70 supported on a block 71 at the upper side of the bearing 30 outwardly of the perpendicular wall of the frame structure in line with the opening between the upright side bars 22.

The operating means for the feed rollers 63 and 64 includes meshing gears 72 and 73 respectively carried by corresponding ends of the shafts 67 and 68. A worm wheel 74 is fixed to the end of the shaft 67 projecting outwardly of the gear 72 and said worm wheel 74 is engaged by a worm 75 fixed to a shaft 76 that carries a gear wheel 77 meshing with the gear wheel 31. It will therefore be seen that upon rotation of the drum 27, step-by-step rotation is imparted to the shaft 29 and gear train 31, 77, 75, 74, 72, and 73 for the rotation of the feed rollers 63 andl 64 in a step-by-step movement for feeding the wire strand 42ª. The wire strand 42ª is fed through the machine and is guided in its movements by a pair of superposed guide bars 78 and 79 shown more clearly in Figures 3, 4, 6, 9 and 10, the guide bars 78 and 79 being supported at corresponding ends in the upper end of the perpendicular wall 21, the other ends of the bars 78 and 79 being seated in the saddle 80 with the ends 81 of the saddle supported upon the upper sides of the horizontal bars 24 and anchored thereto by the screws 82. The ends of the bars 78 and 79 supported in the saddle 80 as shown in Figure 6 are anchored therein by the screws 83 and the bottom face of the upper bar 78 has a longitudinally extending groove therein to accommodate the guiding passage for the wire strand 42ª.

Means is provided for cutting a length of wire from the strand 42ª to form a resilient thread guide arm 42 as the same passes outwardly of the forward ends of the guide bars 78 and 79 and said means includes a combined carrier and die shown in detail in Figures 13, 14 and 15 and in cooperation with other elements of the machine in Figures 4, 5 and 7 to 10, the combined carrier and die being designated in general by the reference character 84 and comprising a block 85, the dove-tailed formation having the wider flat face 86 thereof slidably engaged with the inner face of the perpendicular bearing plate 25 and retained in position for vertical sliding movements by means of the retainer strips 87 overlying the beveled sides 88 of the block 85 with the retainer strips 87 anchored as at 89 to the bearing plate 25. The block 85 of the combined carrier and die comprises a horizontal central body portion 90 shown in Figure 4 as having a pair of apertured upstanding arms 91 rising therefrom for purposes presently to appear and a depending central rib 92 to the front and rear faces of which a pair of die plates 93 and 94 are respectively secured by the screw 95. The lower end of the die plate 93 moves over the adjacent ends of the guide bars 78 and 79 for severing a length of wire from the strand 42ª to provide a resilient thread guide arm, the bottom face of the die plate 93 being grooved as at 96 to seat the thread guide arm 42. The lower end of the die plate 94 carries a depending fork 97 to straddle the resilient thread guide arm 42 and guide the same in its movement downwardly into engagement with the flat side 41 of the needle shank 38.

Means is provided for holding the thread guide arm 42 in the groove at the lower end of the die plate 93 and in the fork 97 at the lower end of the die plate 94 and said means is shown more clearly in Figures 3, 7, 8 and 14, the same comprising a bell-crank lever 98 pivoted intermediate its ends as at 99 between a pair of lugs 100 projecting laterally of the combined carrier and die, the lower arm 101 of the bell-crank lever carrying a laterally directed finger 102 that is adapted to extend across the forked lower end 97 of the die plate 94 for supporting engagement with the resilient thread guide arm 42 to retain the same in position on the carrier until the carrier is lowered to deposit the thread guide arm onto the needle shank 38. The upper lever arm 103 of the bell-crank lever 98 has a spring connection 104 with the upper end of the combined carrier and die for normally influencing the lower lever arm 101 and finger 102 carried thereby away from its supporting position with respect to the thread guide arm 42. A vertical plate 105 is secured to the inner side of the perpendicular bearing plate 25 and has a vertical bar 106 with a lower beveled end 107 secured thereto. An arm 108 is pivoted at its lower end as at 109 upon the vertical plate 105, the upper terminal end of the arm 108 being beveled as at 110 while a spring 111 engaged with the upper end of the arm 108 normally influences the upper end thereof into engagement with the vertical bar 106. When the combined carrier and die is at its limit of upward movement, the upper end of the bell-crank lever arm 103 has a laterally extending pin 112 carried to be disposed at the upper bevel end 110 of the arm 108. Upon downward movement of the combined carrier and die 84, the pin 112 upon the upper end of the bell-crank lever rides over the upper bevel end 110 of the pivoted arm 108 to move down the outer side thereof as illustrated in Figure 7 for moving the bell-crank lever 98 on its pivot 99 against the tension of the spring 104 for positioning the finger 102 across the fork 97 of the die plate 94 in supporting engagement with a thread guide arm 42 located in the fork. When the combined carrier and die reaches its limit of lower movement as illustrated in Figure 8, the pin 112 carried by the bell-crank lever moves downwardly below the lower pivoted end of the arm 108 and by action of the spring 104 the bell-crank lever is moved on its pivot 99 for displacing the finger 102 relative to the fork 97, and positioning the pin 112 carried by the bell-crank lever to a position between the pivoted arm 108 and the beveled end 107 as shown in Figure 8 of the bar 106, upward movement of the combined carrier and die causing the pin 112 to ride over the inclined face 107 to move the bell-crank lever on its pivot 99 and again position the finger 102 across the fork 97, the combined carrier and die moving upwardly a distance sufficient to position the pin 112 above the upper beveled end 110 of the arm 108.

The operating means for the combined carrier and die 84 as shown in Figures 1 and 3 comprises a disk 113 eccentrically mounted upon the shaft 49 and keyed thereto, the eccentric disk 43 being surrounded by a two-part band strap 114 with the parts of the band strap secured together as at 115, the lower section of the two-part band strap 114 carrying a depending pitman rod 116 having a turn-buckle adjustment 117, the lower end of the pitman rod 116 being pivotally attached between the upstanding ears 91 arising from the upper end of the body portion 90 of the combined carrier and die 84.

In the operation of the needle welding machine, rotation is imparted to the shaft 49 through the medium of the worm and gear drives 47 and 48 for the operation of the cam disks 50 and 113, the eccentric mounting of said disks upon the shaft 49 being such that the rotatable drum 27 is stationary during descending movement of the combined carrier and die 84 under the influence of its associated operating eccentric disk 113. The eccentric disk 50 operated by the shaft 49 lowers the pitman rod 53 to effect a quarter revolution of the drum 27, the passage of a needle blank-receiving slot 35 in the peripheral surface of the drum receiving a needle blank from the discharge chute 44 of the hopper 43, the limit of downward movement of the pitman rod 53 positioning a needle blank receiving groove 35 in its uppermost position relative to the machine as illustrated in Figure 3.

The needle blank is received in the groove 35 without respect to the location of the flat side 41 of the shank 38 to the drum and it being essential that the flat side 41 of the needle blank shank be directed upwardly or outwardly of the drum, devices are provided for effecting rotation of the needle blank and for holding the same when rotated to position the flat side 41 in an upward direction. As shown in Figures 3, 4, 5, 11 and 12, the mounting end 37 of the needle blank has the outer end thereof movable in contact with a cam bar 118 secured to the undersides of the horizontal bars 24 and extending transversely thereof for correctly positioning the needle blank transversely of the drum 27. When the needle blank is moved by the drum 27 to a position beneath and between the bars 24, the same is engaged at its upper side by an arm 119 pivoted at one end as at 120 upon one of the bars 24 and spring-pressed as at 121, the lower face of the lever arm 119 being serrated as at 122 to effect rotation of the needle blank when the same is moved by the drum 27 over the lower face of the lever arm 119. The lever arm 119 has the mounting hub 37 of the needle blank moving in contact therewith. Another lever arm 123 is pivotally mounted as at 124 upon the opposite horizontal bar 24 being spring-pressed as at 125 and the lower flat face of the lever arm 123 finds seating engagement with the concaved flattened face 40 in the conical neck 39 of the needle blank and operates to hold the needle blank against rotation with the flat side 41 of the shank 38 of the needle blank in an upward direction.

The ninety-degree step-by-step rotation of the drum 27 effects a step-by-step rotation of the shaft 29 for the gear train operation of the wire strand feed rollers 63 and 64, the wire strand 42ª being fed from a reel in a step-by-step movement to project a length of the wire strand 42ª beyond the ends of the guide bars 78 and 79 corresponding to the length of a thread guide arm for attachment to the needle blank. Continued rotation of the shaft 49 causes upward movement of the pitman rod 53 and an escape movement of the pawl 60 relative to the ratchet teeth 62 on the hub 28 of the drum 27, the escape movement of the pawl 60 rendering the drum 27 and wire strand feed rollers 63 and 64 idle. The eccentric disk 113 is so related in its mounting on the shaft 49 to the eccentric disk 50 as to be operative for lowering the pitman rod 116 while the feed rollers are idle and the lowering move-
ment of the combined carrier and die to cause the die plate 93 to cut the projecting end of the wire strand at the outer ends of the guide bars 78 and 79 with the cut strand section or thread guide arm 42 received in the notches in the lower ends of the die plates 93 and 94 between the depending fork 97 with the end of the thread guide arm 42 projecting beyond the fork 97 as illustrated in Figures 4, 9 and 10. When the combined carrier and die is at its limit of upward movement, as shown in Figures 7 and 9, the finger 102 supports the thread guide arm 42 at the lower sides of the die plates 93 and 94 with the pin 112 located over the upper beveled end 110 of the tensioned pivoted arm 108. During downward movement of the combined carrier and die the pin 112 rides over the outer side of the tensioned pivoted arm 108 with the finger 102 retaining the thread guide arm in position. When the combined carrier and die reaches its limit of lower movement as shown in Figures 8 and 10, the pin 112 escapes the lower end of the pivoted arm 108 and the bell-crank lever 98 being moved on its pivot 99 by means of the spring 104 displaces the finger 102 relative to its supporting position with respect to the thread guide arm and at this time the lower flat side of the thread guide arm is placed in engagement with the upper flat side 41 of the shank 38 of the needle blank.

The outer projecting ends of the shank 38 of the needle blank and the resilient thread guide arm 42 are welded together by means of a stationary electrode 126 and a movable electrode 127, the stationary electrode 126 being so positioned as to have the projecting end of the shank 38 of the needle blank seated thereon during rotative feeding movement of the drum 27 for the feeding blank as will at once be apparent from an inspection of Figures 9 and 10.

The operating and control devices for the electrodes 126 and 127 are illustrated in Figure 1, an upright support 128 carrying upon one face thereof a bearing 129 for a shaft 130, a three-armed lever being loosely mounted on the shaft 130 and including an elongated arm 131 extending rearwardly of the support 128 and upwardly and downwardly extending inclined arms 132 and 133 respectively disposed at the opposite side of the support 128. A coil spring 134 connects the lever arm 131 to the support 128 for normally influencing the inclined lever arm 132 in an upward direction, such movement being limited by an adjustable stop 135 carried by an arm 136 projected laterally of the upper end of the support 128. A stop arm 137 projects from the bearing 129 to be engaged by the lower lever arm 133. The stationary negative electrode 126 is carried by a member 138 mounted on the support 128. The movable positive electrode 127 is carried by one end of a lever 139 that is mounted on the shaft 130 and is adjustably fixed to said shaft by means of the set screw 140. The other end of the lever 139 projects rearwardly of the support 128 and has a spring connection 141 with the adjacent end of the lever arm 131.

A pair of electrical conductors 142 leading from a source of energy is in communication with a pair of normally spaced contacts 143 and a closing device 144 pivotally mounted upon the support 128 has a spring connection 145 with the lever arm 133. The upper end of the lever arm 132 carries a transversely extending rod 146 that is adapted to be engaged by the free end of an arm 147 radially projecting from and secured by means of its bearing 148 to the adjacent end of the drive shaft 49. Upon rotation of the shaft 49, the arm 147 engages the rod 146 to move the three-armed lever on the shaft 139 against the tension of the spring 134, pivotal movement of the three-armed lever causing the arm 133 by its resilient connection 145 with the closing device 144 for the contacts 143 to be operative for closing said contacts and through the medium of suitable wiring arrangements energizing the electrodes 126 and 127. Movement of the three-armed lever on the shaft 130 causes pivotal movement of the lever 139 under the influence of the spring 141 so that the upper electrode 127 is lowered into engagement with the adjacent end of the resilient thread guide arm 42 as shown in Figure 10 to accomplish the welding of the thread guide arm to the shank of the needle blank.

After the thread guide arm has been welded to the shank of the needle blank, the cycle of the operation is repeated and upon rotation of the drum 27, the resilient arm 149 secured at its lower end as at 159 to the base plate 29 has the upper end 151 thereof working in the annular groove 152 in the periphery of the drum 27 with the upper end 151 moving into entrance slot 36 to the groove 35 for disengaging a welded needle from the groove and causing its discharge into a suitable receptacle from the feeding drum.

From the above detailed description of the invention, it is believed that the construction and operation thereof will at once be apparent, and while there are herein shown and described the preferred embodiments thereof, it is to be understood that minor changes may be made in the details of construction, such as will fall within the scope of the invention as claimed.

I claim:

1. In a needle welding machine, wherein a resilient thread guide arm is welded to the flattened side of the shank of a needle blank, a rotatable drum having needle blank supports on its peripheral surface, means engageable with the needle blank to rotate and hold the same in position with the flattened side directed away from the drum, means for feeding a strand of resilient wire into position above a needle blank supported in the drum, a combined carrier and die for cutting a thread guide arm from the strand of resilient wire and placing the same upon the flattened side of the needle blank and means for welding the thread guide arm to the needle blank at corresponding ends thereof.

2. A needle welding machine as set forth in claim 1, wherein timed operating devices are provided for rotating the drum in step-by-step movements and simultaneously operating the wire strand feeding means and other timed operating devices for operating the combined thread guide arm carrier and die and the welding means when the aforesaid operating devices are at rest.

3. A welding machine as set forth in claim 1, wherein the needle blank supports on the drum comprise grooves with entrance depressions laterally of the grooves, the drum having an annular groove over which the needle blanks extend and a resilient arm having one end riding in the annular groove at a point to effect displacement of a needle after the welding thereof.

4. A needle welding machine as set forth in claim 1, wherein timed operating devices are provided for rotating the drum in step-by-step movements and simultaneously operating the wire strand feeding means and other timed operating devices for operating the combined thread guide arm carrier and die and the welding means when the aforesaid operating devices are at rest, the needle blank supports on the drum comprising grooves with entrance depressions laterally of the grooves, the drum having an annular groove over which the needle blanks extend and a resilient arm having one end riding in the annular groove at a point to effect displacement of a needle after the welding thereof.

5. A needle welding machine as set forth in claim 1, wherein the rotating and holding means for the needle blank comprises a pair of tensioned pivotally mounted arms simultaneously engaged with a needle blank, one of said arms having a serrated face to effect turning of the needle blank and the other arm adapted to hold the needle blank against rotation when the needle blank has been rotated to present the flattened side for contact with the last named arm.

6. A needle welding machine as set forth in claim 1, wherein timed operating devices are provided for rotating the drum in step-by-step movements and simultaneously operating the wire strand feeding means and other timed operating devices for operating the combined thread guide arm carrier and die and the welding means when the aforesaid operating devices are at rest, the rotating and holding means for the needle blank comprising a pair of tensioned pivotally mounted arms simultaneously engaged with a needle blank, one of said arms having a serrated face to effect turning of the needle blank and the other arm adapted to hold the needle blank against rotation when the needle blank has been rotated to present the flattened side for contact with the last named arm.

7. A needle welding machine as set forth in claim 1, wherein the wire strand feeding means comprises a pair of feed rollers receiving the strand from a reel, one of said rollers being tensioned towards the other roller to effect frictional engagement with the wire strand and guide bars for leading the wire from the feed rollers to the combined carrier and die.

8. A needle welding machine as set forth in claim 1, wherein timed operating devices are provided for rotating the drum in step-by-step movements and simultaneously operating the wire strand feeding means and other timed operating devices for operating the combined thread guide arm carrier and die and the welding means when the aforesaid operating devices are at rest, the wire strand feeding means comprising a pair of feed rollers receiving the strand from a reel, one of said rollers being tensioned towards the other roller to effect frictional engagement with the wire strand and guide bars for leading the wire from the feed rollers to the combined carrier and die.

9. A needle welding machine as set forth in claim 1, wherein the combined carrier and die includes a die cutter for severing a length of wire from the strand to form the resilient thread guide arm and means on the carrier for supporting the cut strand when the carrier moves toward the needle blank supporting drum.

10. A needle welding machine as set forth in claim 1, wherein the combined carrier and die includes a die cutter for severing a length of wire from the strand to form the resilient thread guide arm, a lever pivoted on the carrier having a finger at the lower end thereof for supporting the cut strand on the carrier when the carrier moves toward the needle blank supporting drum.

11. A needle welding machine as set forth in claim 1, wherein the combined carrier and die includes a die cutter for severing a length of wire from the strand to form the resilient thread guide arm, means on the carrier for supporting the cut strand when the carrier moves toward the needle blank supporting drum, and means for rendering the last named means inoperative when the cut strand has been placed on the needle blank.

12. A needle welding machine as set forth in claim 1, wherein the combined carrier and die includes a die cutter for severing a length of wire from the strand to form the resilient thread guide arm, a lever pivoted on the carrier having a finger at the lower end thereof for supporting the cut strand on the carrier when the carrier moves toward the needle blank supporting drum, and means engageable with the upper end of the lever for effecting movement thereof when the carrier and die reaches its approximate limit of downward movement for displacing the finger at the lower end of the lever relative to its cut strand supporting position.

13. A needle welding machine as set forth in claim 1, wherein timed operating devices are provided for rotating the drum in step-by-step movements and simultaneously operating the wire strand feeding means and other timed operating devices for operating the combined thread guide arm carrier and die and the welding means when the aforesaid operating devices are at rest, the combined carrier and die including a die cutter for severing a length of wire from the strand to form the resilient thread guide arm and means on the carrier for supporting the cut strand when the carrier moves toward the needle blank supporting drum.

14. A needle welding machine as set forth in claim 1, wherein timed operating devices are provided for rotating the drum in step-by-step movements and simultaneously operating the wire strand feeding means and other timed operating devices for operating the combined thread guide arm carrier and die and the welding means when the aforesaid operating devices are at rest, the combined carrier and die including a die cutter for severing a length of wire from the strand to form the resilient thread guide arm and a lever pivoted on the carrier having a finger at the lower end thereof for supporting the cut strand on the carrier when the carrier moves toward the needle blank supporting drum.

15. A needle welding machine as set forth in claim 1, wherein timed operating devices are provided for rotating the drum in step-by-step movements and simultaneously operating the wire strand feeding means and other timed operating devices for operating the combined thread guide arm carrier and die and the welding means when the aforesaid operating devices are at rest, the combined carrier and die including a die cutter for severing a length of wire from the strand to form the resilient thread guide arm, means on the carrier for supporting the cut strand when the carrier moves toward the needle blank supporting drum, and means for rendering the last named means inoperative when the cut strand has been placed on the needle blank.

16. A needle welding machine as set forth in claim 1, wherein timed operating devices are provided for rotating the drum in step-by-step movements and simultaneously operating the wire strand feeding means and other timed operating devices for operating the combined thread guide arm carrier and die and the welding means when the aforesaid operating devices are at rest, the combined carrier and die including a die cutter for severing a length of wire from the strand to form the resilient thread guide arm, a lever pivoted on the carrier having a finger at the lower end thereof for supporting the cut strand on the carrier when the carrier moves toward the needle blank supporting drum, and means engageable with the upper end of the lever for effecting movement thereof when the carrier and die reaches its approximate limit of downward movement for displacing the finger at the lower end of the lever relative to its cut strand supporting position.

17. A needle welding macine as set forth in claim 1, wherein the welding means includes a stationary electrode upon which one end of the needle blank is supported, a movable cooperating electrode adapted to be engaged with the adjacent end of the cut strand and means for energizing the electrodes to effect welding of the cut strand as a resilient thread guide arm to the needle blank.

18. A needle welding machine as set forth in claim 1, wherein the welding means includes a stationary electrode upon which one end of the needle blank is supported and a movable cooperating electrode adapted to be engaged with the adjacent end of the cut strand, said electrodes being in communication with a source of electrical energy with a control switch therefor, a tensioned element adapted to be operated for closing said control switch and a support for the movable electrode resiliently engaged with said tensioned element to be moved by said tensioned element.

19. A needle welding machine as set forth in claim 1, wherein the combined carrier and die includes a die cutter for severing a length of wire from the strand to form the resilient thread guide arm, means on the carrier for supporting the cut strand when the carrier moves toward the needle blank supporting drum, and means for rendering the last named means inoperative when the cut strand has been placed on the needle blank, including a bell-crank lever pivoted on the combined carrier and die, the cut strand support comprising a finger projecting laterally of the lower end of the bell-crank lever, a resilient connection between the combined carrier and die and the bell-crank lever above the pivot of the latter for normally influencing the supporting finger out of its supporting position relative to the cut strand and means cooperating with the upper end of the bell-crank lever to effect pivotal movement of said bell-crank lever during the upward movement of the combined carrier and die for restoring the cut strand supporting finger to its supporting position relative to the combined carrier and die.

20. A needle welding machine as set forth in claim 1, wherein the combined carrier and die includes a die cutter for severing a length of wire from the strand to form the resilient thread guide arm, means on the carrier for supporting the cut strand when the carrier moves toward the needle blank supporting drum, and means for rendering the last named means inoperative when the cut strand has been placed on the needle blank, including a bell-crank lever pivoted on the combined carrier and die, the cut strand support comprising a finger projecting laterally of the lower end of the bell-crank lever, a resilient connection between the combined carrier and die and the bell-crank lever above the pivot of the latter for normally influencing the supporting finger out of its supporting position relative to the cut strand and means cooperating with the upper end of the bell-crank lever to effect pivotal movement of said bell-crank lever during the upward movement of the combined carrier and die for restoring the cut strand supporting finger to its supporting position relative to the combined carrier and die, including a pin projecting laterally of the upper end of the bell-crank lever and a tensioned pivoted arm and cam bar with which said pin is associated.

OMER J. RAINVILLE.